US008601896B2

(12) United States Patent  
Skogward

(10) Patent No.: US 8,601,896 B2  
(45) Date of Patent: Dec. 10, 2013

(54) FOLDING GEARSHIFT MECHANISM FOR MOTOR VEHICLE

(75) Inventor: Kenneth Skogward, Huskvarna (SE)

(73) Assignee: Kongsberg Automotive AB, Mullsjo (SE)

( * ) Notice: Subject to any disclaimer, the term of this patent is extended or adjusted under 35 U.S.C. 154(b) by 278 days.

(21) Appl. No.: 13/001,425

(22) PCT Filed: Jun. 27, 2008

(86) PCT No.: PCT/IB2008/052596  
§ 371 (c)(1),  
(2), (4) Date: Feb. 18, 2011

(87) PCT Pub. No.: WO2009/156797  
PCT Pub. Date: Dec. 30, 2009

(65) Prior Publication Data  
US 2011/0132120 A1    Jun. 9, 2011

(51) Int. Cl.  
*B60K 20/00* (2006.01)  
*F16H 59/04* (2006.01)  
*G05G 5/00* (2006.01)  
*G05G 5/08* (2006.01)

(52) U.S. Cl.  
USPC ............... 74/473.3; 74/473.23; 74/473.25; 74/473.26

(58) Field of Classification Search  
USPC ............... 74/473.1, 473.18, 473.21, 74/473.23–473.26, 473.3, 473.33, 523, 74/524, 533, 534  
See application file for complete search history.

(56) References Cited

U.S. PATENT DOCUMENTS

| 4,732,232 | A  | * | 3/1988 | Miyagi et al. ............ 180/336 |
| 4,823,635 | A  | * | 4/1989 | Selby ..................... 74/524 |
| 6,029,535 | A  |   | 2/2000 | Kenny et al. |
| 6,065,560 | A  | * | 5/2000 | Palmeri et al. ........... 180/326 |
| 6,240,803 | B1 |   | 6/2001 | Sjostrom et al. |
| 6,508,090 | B1 | * | 1/2003 | Hasegawa et al. ......... 70/247 |
| 7,172,063 | B2 | * | 2/2007 | Wendeberg et al. ...... 192/220.4 |
| 2002/0026847 | A1 | * | 3/2002 | Lee ................... 74/473.26 |
| 2004/0194567 | A1 | * | 10/2004 | Giefer et al. ............ 74/473.3 |
| 2007/0137364 | A1 | * | 6/2007 | Howe et al. ............ 74/473.21 |
| 2007/0204718 | A1 |   | 9/2007 | Strait et al. |

FOREIGN PATENT DOCUMENTS

| WO |    WO 58646 A1 | * | 10/2000 | ............ F16H 59/10 |
| WO |    02098693    |   | 12/2002 |
| WO |    2006096114  |   | 9/2006  |

OTHER PUBLICATIONS

International Search Report and Written Opinion for International Application PCT/IB2008/052596 dated Apr. 24, 2009.

* cited by examiner

*Primary Examiner* — David M Fenstermacher  
*Assistant Examiner* — Jake Cook  
(74) *Attorney, Agent, or Firm* — Edwards Wildman Palmer LLP; Steven M. Jensen

(57) ABSTRACT

A gearshift assembly for a motor vehicle includes a gearshift lever configured to engage a detent unit to select one of a plurality of gearshift positions in an operative position. The gearshift lever can be folded into a non-operative position by disengaging a locking mechanism from the detent unit, when the gearshift lever is in the neutral position. The non-operative position is selected by pressing a fold button, which causes a fold rod to engage the detent unit, and prevents accidental shifting of gears in the folded non-operative position.

23 Claims, 6 Drawing Sheets

FOLDING GEARSHIFT MECHANISM FOR MOTOR VEHICLE

FIELD OF INVENTION

The present invention relates to a gearshift lever for a motor vehicle, and more particularly to a folding mechanism for an automatic, electronically controlled, shift-by-wire gearshift lever.

BACKGROUND OF THE INVENTION

In some motor vehicles, for example, those equipped with a cab having sleeping accommodations, a gearshift lever can be actuated to a stowed position when not in use. It is desirable for a person to be able to stow the gearshift lever to facilitate movement in the motor vehicle between the driver's seat or passenger's seat and other areas of the vehicle such as a sleeping area of a cab.

It is known to provide a gearshift lever that can be pivoted along a hinge from an operating position to a non-operating position. For example, U.S. Pat. No. 6,240,803 to Sjostrom et al. discloses a gear change mechanism in which a gear lever includes first and second elements connected by a hinge, the gear lever being pivotable between a substantially vertical operating position and a folded position. Similarly, U.S. Pat. No. 6,029,535 to Kenny et al. discloses a gear shift lever for a truck or tractor having upper and lower lever portions that are telescopically and rotatably connected. Gearshift levers which include upper and lower portions that are hinged may suffer from various drawbacks. For example, even in a folded position, the lever still may obstruct the driver, thereby preventing free movement within the cab. As a result, it is possible for the gearshift lever to be accidentally moved and thus shifted to another gear, resulting in unwanted movement of the vehicle. Also, the hinge itself may accidentally move, thus changing the gear position, especially in mechanical gearshifters.

Other gearshift arrangements include U.S. Pat. No. 4,823,635 to Selby, in which upper and lower portions of a shift lever are connected by pins; U.S. Patent Application Publication US 2007/0204718 to Strait et al., which discloses an electrically powered drive system for moving a shifter mechanism between an inoperative location and an operative location; and U.S. Pat. No. 4,732,232 to Miyagi et al., in which a tiltable shift lever assembly includes two pivot axes, and the lever is folded in a lateral direction as compared to a longitudinal direction of the vehicle. However, the above arrangements may suffer from drawbacks such as a larger number of parts, increased manufacturing complexity, and thus higher costs. Further, in the above arrangements, it may be possible to bump or otherwise contact the lever and accidentally change the gear position, even when in the stowed position.

A published PCT application, WO 2006/096114, owned by Kongsberg Automotive AB (which owns the instant application), describes a shift-by-wire solution for a gear shifter. In particular, a first sensor or magnet is configured to move with a gear lever, and a plurality of second sensors are arranged at different positions, the second sensors being sensitive to magnetism. The second sensors are arranged at gear positions, such that the current gear position can be read off and electronically transmitted to the gearbox.

It would be desirable to provide a gearshift mechanism for an automatic, electronically controlled, shift-by-wire gearshift lever that can be moved between an unfolded operative position and a folded non-operative position, in which the mechanism includes a plurality of predefined gearshift positions. The folding gearshift lever and related methods of manufacturing and using the gearshift lever should overcome the deficiencies of the presently available methods and systems.

SUMMARY OF THE INVENTION

A gearshift mechanism for a motor vehicle is provided, including a gearshift lever that is configured to move between an operative position and a non-operative or stowed position. The gearshift lever can be stowed when not in use, for example, to facilitate movement of persons between the driver's seat or passenger's seat and another area of the motor vehicle, for example, a sleeping area of a cab. The gearshift mechanism of the subject invention can provide enhanced security, since the gearshift lever can only be folded into the stowed position when the gearshift lever is in a specific gearshift position. The gearshift lever preferably is movable between a plurality of predefined operative gearshift positions, such as reverse (R), neutral (N), automatic (A) and manual (M), and the non-operative or "Fold" position. Optionally, these predefined positions can be different in quantity and/or function. For example, the automatic (A) position could be replaced by drive (D) and/or overdrive (O), and the manual (M) position could be replaced by one or more gears, such as 1, 2, and 3, or low (L), 2, and 3, or any other suitable number or combination of gears. For example, the gearshift lever can be a shift-by-wire gearshift lever which utilizes a sensor arrangement for selecting gear position such as that disclosed in WO 2006/096114, which is hereby incorporated by reference herein.

A gearshift assembly for a motor vehicle preferably includes a gearshift lever configured to rotate relative to the gearshift assembly; a detent unit having a plurality of detents corresponding to gearshift positions, the detent unit being engaged by the gearshift lever in one of the gearshift positions; a locking mechanism configured to engage the detent unit in an operative position, and disengage from the detent unit in a non-operative position; and a fold actuator operably connected to the locking mechanism for disengaging the locking mechanism from the detent unit in the non-operative position, such that the gearshift lever is folded relative to the gearshift assembly.

A method for folding a gearshift lever relative to a gearshift assembly in a motor vehicle preferably includes steps of: providing a detent unit having a plurality of detents corresponding to gearshift positions, the detent unit being engaged by the gearshift lever in one of the gearshift positions; engaging the detent unit with a locking mechanism in an operative position, the detent unit being prevented from rotation and the gearshift lever being rotatable to select one of the gearshift positions in the operative position; operating a fold actuator to disengage the locking mechanism from the detent unit in a non-operative position; and folding the gearshift lever relative to the gearshift assembly.

Other aspects and embodiments of the invention are discussed below.

BRIEF DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein.

DEFINITIONS

The instant invention is most clearly understood with reference to the following definitions:

As used in the specification and claims, the singular form "a", "an" and "the" include plural references unless the context clearly dictates otherwise.

DETAILED DESCRIPTION OF THE INVENTION

A gearshift mechanism for a motor vehicle includes a gearshift lever that is movable between an operative position and a non-operative position. In the non-operative position, the gearshift lever can be stowed, so as to enable persons to move freely through the passenger compartment of the vehicle. Preferably the gearshift lever can only be folded into the stowed position when the gearshift lever is in a specific gearshift position, such as the N or neutral position. The gearshift lever preferably includes a plurality of predefined operative gearshift positions, such as reverse (R), neutral (N), automatic (A) and manual (M), and the non-operative or "Fold" position. Optionally, these predefined positions can be different in quantity and/or function. For example, the automatic (A) position could be replaced by drive (D) and/or overdrive (O), and manual (M) position could be replaced by one or more gears, such as 1, 2, and 3, or low (L), 2, and 3, or any other suitable number or combination of gears.

For example, the gearshift lever can be a shift-by-wire gearshift lever which utilizes a sensor arrangement for selecting gear position such as that disclosed in WO 2006/096114, which is hereby incorporated by reference herein.

The gearshift mechanism of the subject invention preferably incorporates a folding mechanism including at least the gearshift lever, a fold actuator, and a release actuator. The fold actuator is provided to activate folding of the gearshift lever, and the release actuator preferably activates movement of the gearshift lever between different gearshift positions. The folding mechanism preferably further includes at least an interlock mechanism, a detent unit, and a locking mechanism, as described herein.

Figure 1:
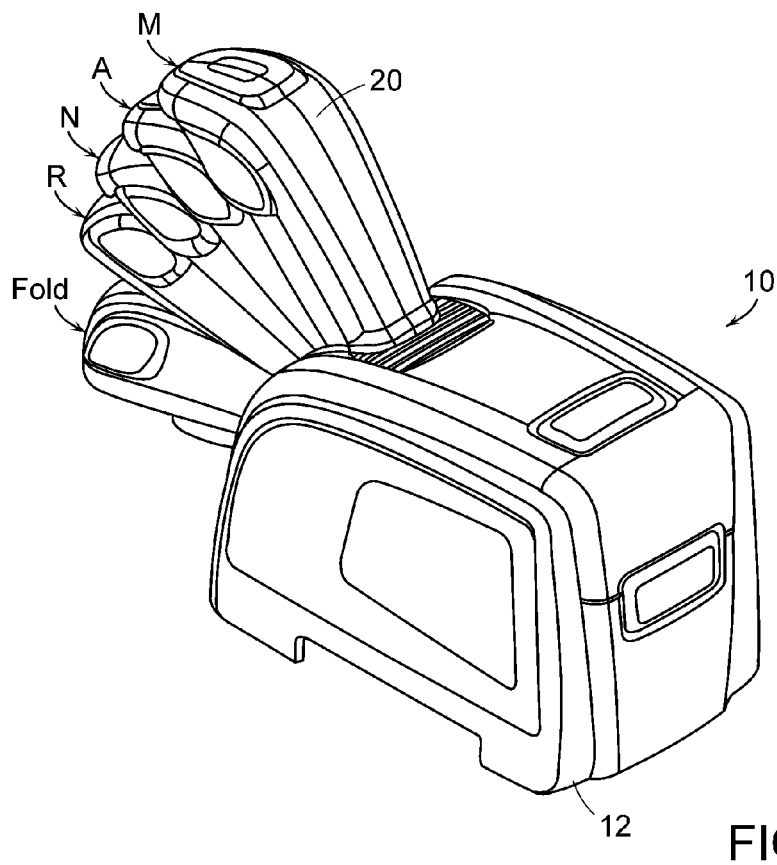
FIG. 1 is a left side perspective view of a gearshift mechanism according to the subject invention showing multiple positions of a gearshift lever.
Figure 2:
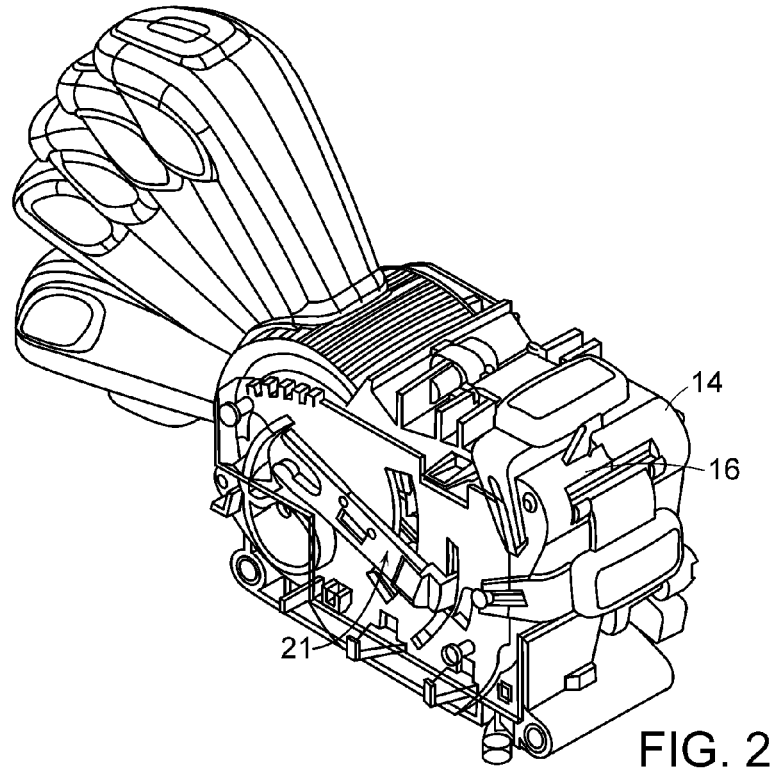
FIG. 2 is a left side perspective view of the gearshift mechanism of FIG. 1 in which portions of the gearshift mechanism have been removed.

Referring to FIGS. 1 and 2, a gearshift mechanism 10 is shown, where the gearshift mechanism 10 includes a gearshift lever 20 pivotally connected to the gearshift mechanism, the gearshift lever being rotatable within the gearshift mechanism 10 to select one of a plurality of predefined gearshift positions. The gearshift mechanism 10 includes at least an outer housing 12 (see FIG. 1), which encloses an inner housing defined by a right side housing portion 14 and a left side housing portion 16, which are configured to be interconnected and receive the gearshift lever 20 (see FIG. 2). The right and left side housing portions 14, 16 also enclose at least a portion of the gearshift lever 20, as shown in FIGS. 1 and 2. The gearshift lever 20 preferably is pivotally attached to the inner housing at a first pivot point 60 (see FIGS. 3 and 4). The gearshift lever 20 can be operably connected to a magnet arm 21 or similar structure for selecting one of the gearshift positions, such that when the gearshift lever 20 is actuated, the magnet arm 21 will sense the corresponding gearshift position, e.g., in the manner described in WO 2006/096114.

Figure 3:
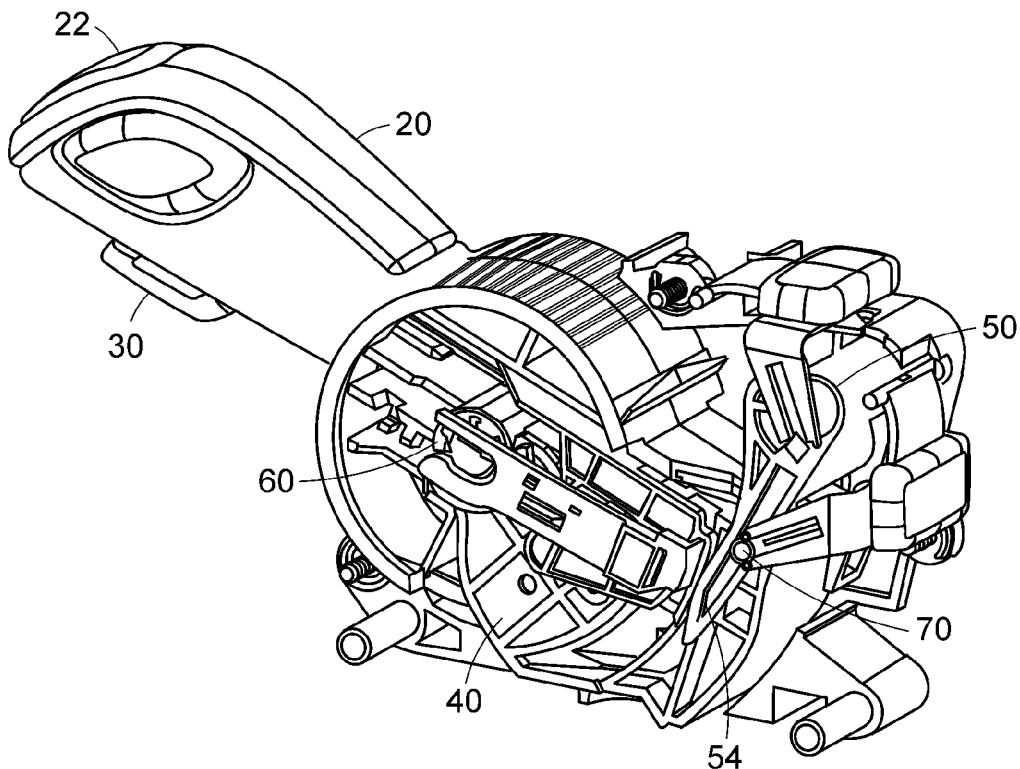
FIG. 3 is a left side perspective view of a gearshift mechanism according to the subject invention in which the gearshift lever is fixed in a neutral position, and portions of the gearshift mechanism have been removed.
Figure 7:
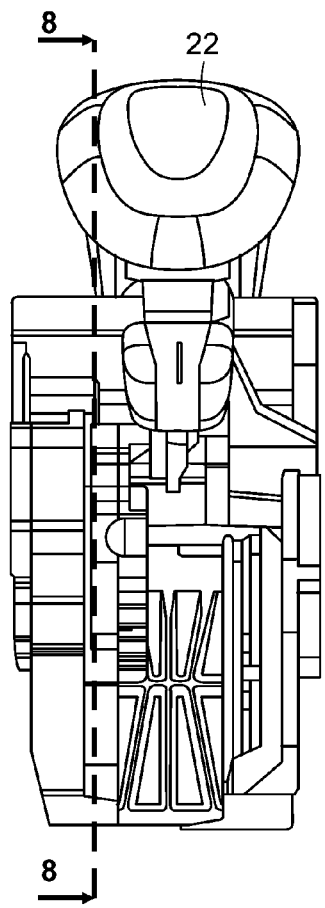
FIG. 7 is a front view of the gearshift lever of FIG. 3.
Figure 8:
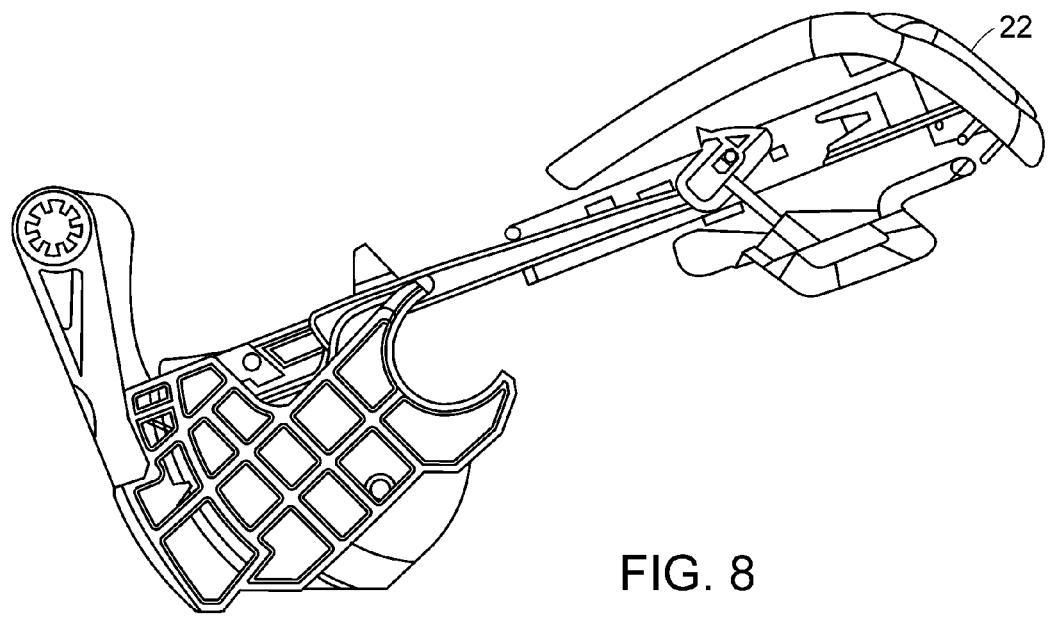
FIG. 8 is a cross-sectional right side view of the gearshift lever of FIG. 7.
Figure 9:
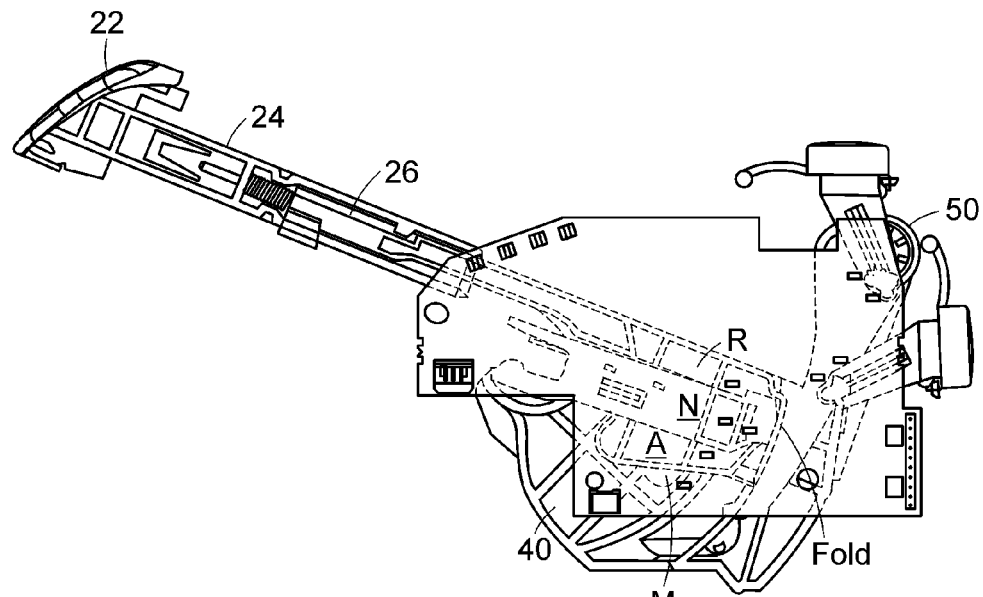
FIG. 9 is a left side perspective view of a gearshift mechanism of the subject invention in which the gearshift lever is arranged in the neutral position.

As shown in FIG. 3, the gearshift lever 20 includes a fold actuator or fold button 22 on a knob of the gearshift lever 20 (see also FIGS. 7 and 8). The fold actuator 22 is operably connected to a fold rod defined by an upper part 24 that extends from the gearshift lever 20 into the inner housing, and a lower part 26 that extends from the upper part 24 to a detent unit 40 (see, e.g., FIGS. 3, 4, and 9). As used herein, the term "upper" refers to a portion of the gearshift lever that is closest to the knob, whereas the term "lower" refers to a portion of the gearshift lever furthest from the knob, and thus closest to the vehicle's gearbox. The lower part 26 of the fold rod preferably abuts the detent unit 40 and a locking arm 50, as shown in FIG. 9.

Figure 5:
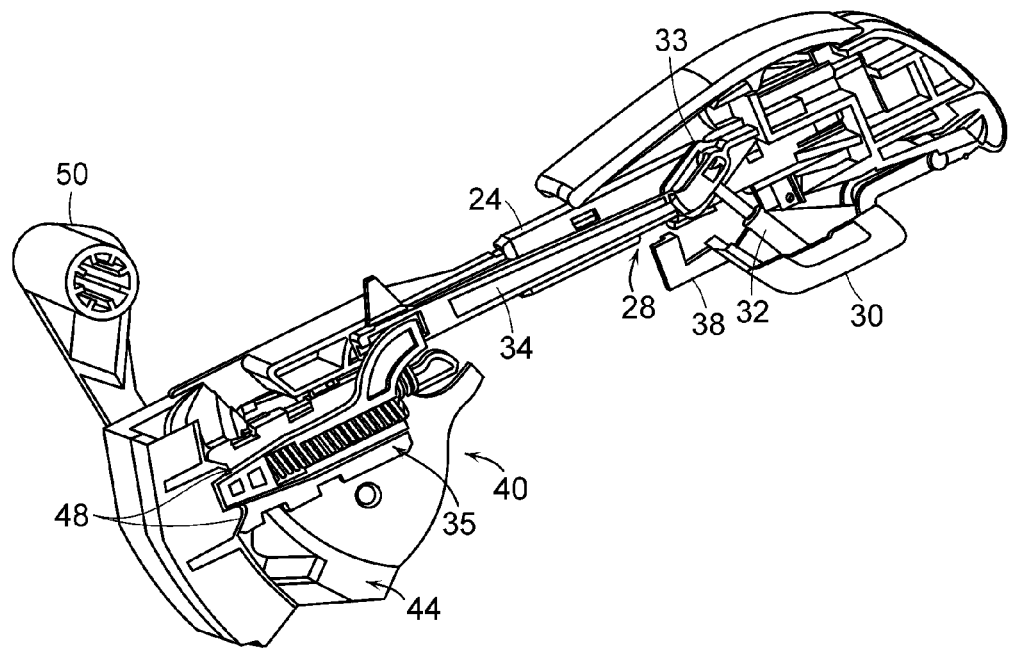
FIG. 5 is a right side perspective view of the gearshift lever used in the gearshift mechanism of FIG. 3.

Referring to FIGS. 3 and 5, a release actuator 30 preferably is located on the knob of the gearshift lever 20, for example, on a bottom portion of the knob. The release actuator 30 preferably includes a cylinder portion 32 that extends through an aperture 33 in a release rod 34 of the gearshift lever 20. The cylinder portion 32 is configured to slidingly abut the release rod 34 in a part of the aperture 33. The release rod 34 preferably extends from the aperture 33 through the gearshift lever 20 substantially parallel to the upper and lower parts 24, 26 of the fold rod. A lower release body 35 is operably connected to the release rod 34, the release body 35 being configured to engage the detent unit 40.

The gearshift lever 20 further includes an interlock mechanism formed by a generally square-shaped locking groove 28 on the upper part 24 of the fold rod that is configured to engage with an L-shaped portion 38 of the release actuator 30, such than in an operative position of the gearshift lever 20, the locking groove 28 can be engaged with the L-shaped portion 38 of the release actuator 30 in a transverse direction (as compared to the longitudinal direction of the fold rod), as shown in FIG. 5.

Upon activation of the fold actuator 22, the fold rod 24, 26 moves in a longitudinal direction toward the locking arm 50, such that the locking groove 28 cannot be engaged with the L-shaped portion 38, which prevents actuation of the release actuator 30 in the fold position. Operation of the folding mechanism for stowing the gearshift lever 20 is described later.

Operation of the release actuator 30 will now be described, where the release actuator 30 is used to change the gearshift position when the gearshift lever is in one of the operative positions. Upon activation of the release actuator 30, the release actuator 30 slides and frictionally engages the release rod 34, through the aperture 33 of the release rod 34, which forces the release rod 34 to move in a longitudinal direction away from the detent unit 40. At the same time, the L-shaped portion 38 of the release actuator 30 engages with the locking groove 28 of the upper part 24 of the fold rod, thereby preventing parallel activation of the fold rod, the fold rod being prevented from further movement in the longitudinal direction toward the detent unit 40.

Referring to FIGS. 3-6 and 11, the detent unit 40 preferably is pivotally attached to the inner housing of the gearshift mechanism at the first pivot point 60. The gearshift lever 20 and the detent unit 40 preferably are independently pivotally mounted relative to the gearshift mechanism 10. As shown in FIGS. 3-6, the detent unit 40 can be shaped like a cradle (see FIG. 11), and is configured to pivot relative to the first pivot point 60. In particular, the detent unit 40 preferably includes an outer plate 42 (see FIG. 4) that covers an inner portion which includes an index track 44 (see FIG. 5) along a first portion of the detent unit 40, and one or more detents 46 along a second portion of the detent unit 40. The detents 46 each can be formed internally with one or more release hooks 48 configured to engage the release body 35.

Preferably, the detent unit 40 has a generally curvilinear shape, and the inner portion is covered by the outer plate 42. In the inner portion of the detent unit 40, the release hook 48 is configured to engage the release body 35, as shown in FIG. 5. Further, the locking arm 50 is configured to engage the one or more detents 46 on an outside of the outer plate 42 of the detent unit 40, to provide a locking engagement.

The detents 46 and the locking arm 50 form respective parts of the locking mechanism, which is used to lock the release lever 20 in a specific gear position, for example, as shown in FIGS. 3-6. The locking arm 50 can pivot relative to the inner housing via a second pivot point 70, which has an axis preferably parallel to that of the first pivot point 60. The locking arm 50 preferably is formed with at least two branches, a locking branch 52 and a release branch 54, where the locking branch 52 is configured to lock the detent unit 40 from rotation by engaging with one of the detents 46. The locking branch 52 can terminate in a hook to engage the detent 46 in a locked position, where the hook of the locking branch 52 is disengaged from the detent 46 in an unlocked position. The release branch 54 of the locking arm 50 extends along an opposite end of the locking arm 50, as shown in FIG. 3, and preferably abuts the lower part 26 of the fold rod (see FIG. 9). The locking arm 50 is rotatably biased toward the locked position by a torsion spring, for example, where the torsion spring can be positioned in the vicinity of the second pivot point 70.

Figure 4:
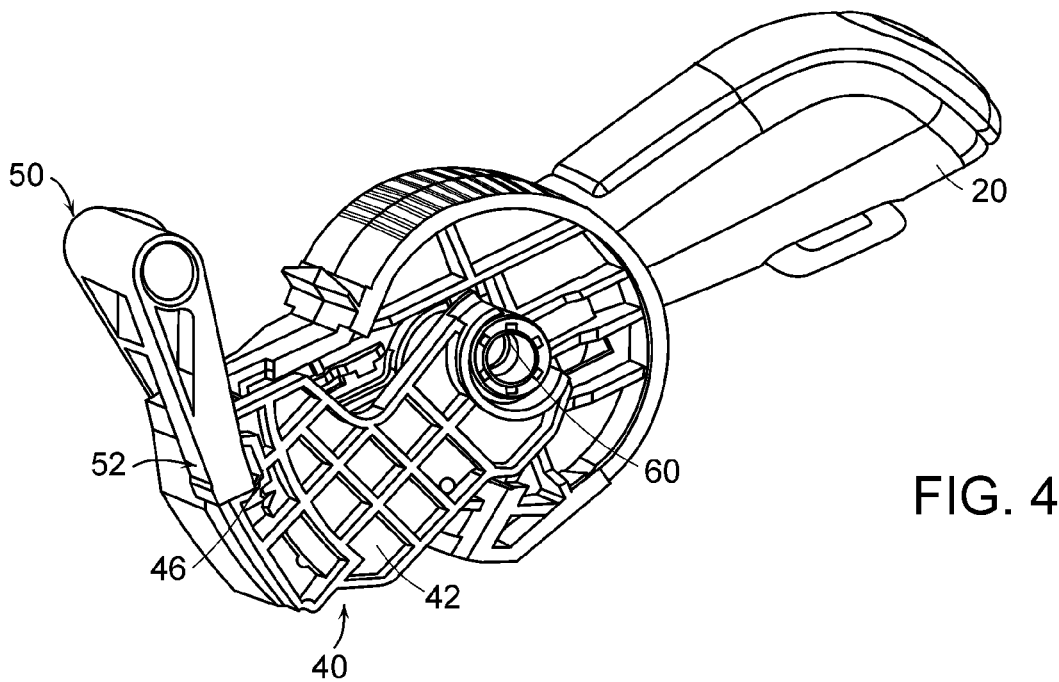
FIG. 4 is a right side perspective view of the gearshift mechanism of FIG. 3.

In an unfolded operative position of the gearshift lever 20, the locking branch 52 of the locking arm 50 preferably engages the detent 46 on the outer portion of the detent unit 40, as depicted in FIG. 4. This engagement can secure the detent unit 40 from rotation about the first pivot point 60. When the locking arm 50 is so engaged with the detent 46, the gearshift lever 20 can be rotated about the first pivot point 60 relative to the detent unit 40, for example, as shown schematically in FIGS. 1 and 2. A specific position of the gearshift lever 20 in relation to the detent unit 40 corresponds to a specific gear, for example, gearshift positions such as reverse (R), neutral (N), automatic (A) and manual (M). These different gearshift positions are depicted schematically in FIG. 9, in which the gearshift lever 20 is shown in the N position.

Figure 6:
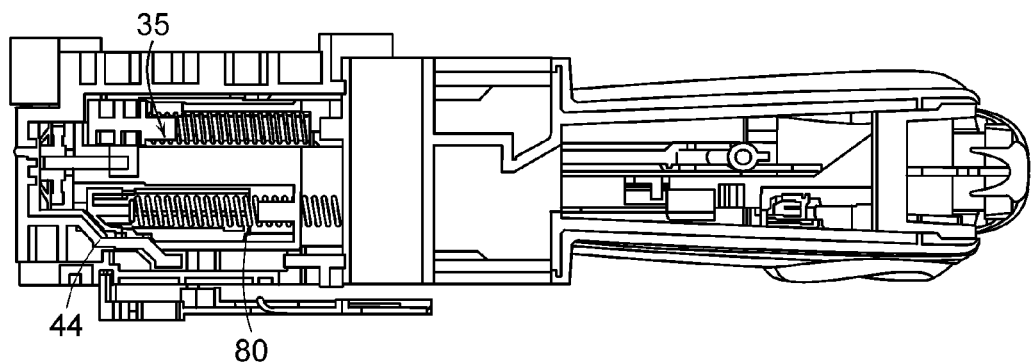
FIG. 6 is a top perspective view of the gearshift lever of FIG. 5.

A plunger 80 in the gearshift lever 20, as shown in FIG. 6, can move along the index track 44 of the detent unit 40 providing feedback to the driver on the specific gearshift position. When the gearshift lever 20 is in the N position, as shown in FIG. 9, the release body 35 is engaged with the release hook 48 of the detent unit 40. In order to move the gearshift lever 20 to another position, the release actuator 30 must be activated. Upon activation, usually via manual engagement by the driver, the release body 35 disengages from the release hook 48, thereby allowing rotation of the gearshift lever 20 to another gearshift position. Each of the detents 46 has one or more corresponding release hooks 48, which can be of a quantity and configuration as desired to secure the release body 35 at a particular gearshift position.

To move the gearshift lever 20 from an unfolded operative position to a folded non-operative position, the gearshift lever 20 must be rotated in relation to the detent unit 40 to the N or neutral position. Only in this specific gearshift lever position will the fold actuator 22 be enabled to be activated, as the lower part 26 of the fold rod is configured to engage with both a longitudinally-extending groove 47 in the detent unit 40 and the release branch 54 of the locking arm 50, as shown in FIGS. 9-11.

Figure 10:
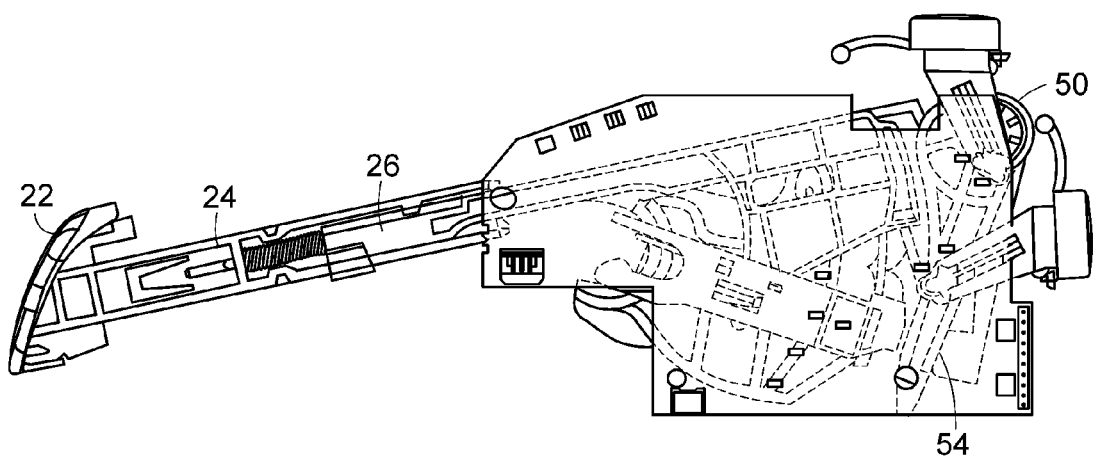
FIG. 10 is a left side perspective view of a gearshift mechanism of the subject invention in which the gearshift lever is in the fold position.
Figure 11:
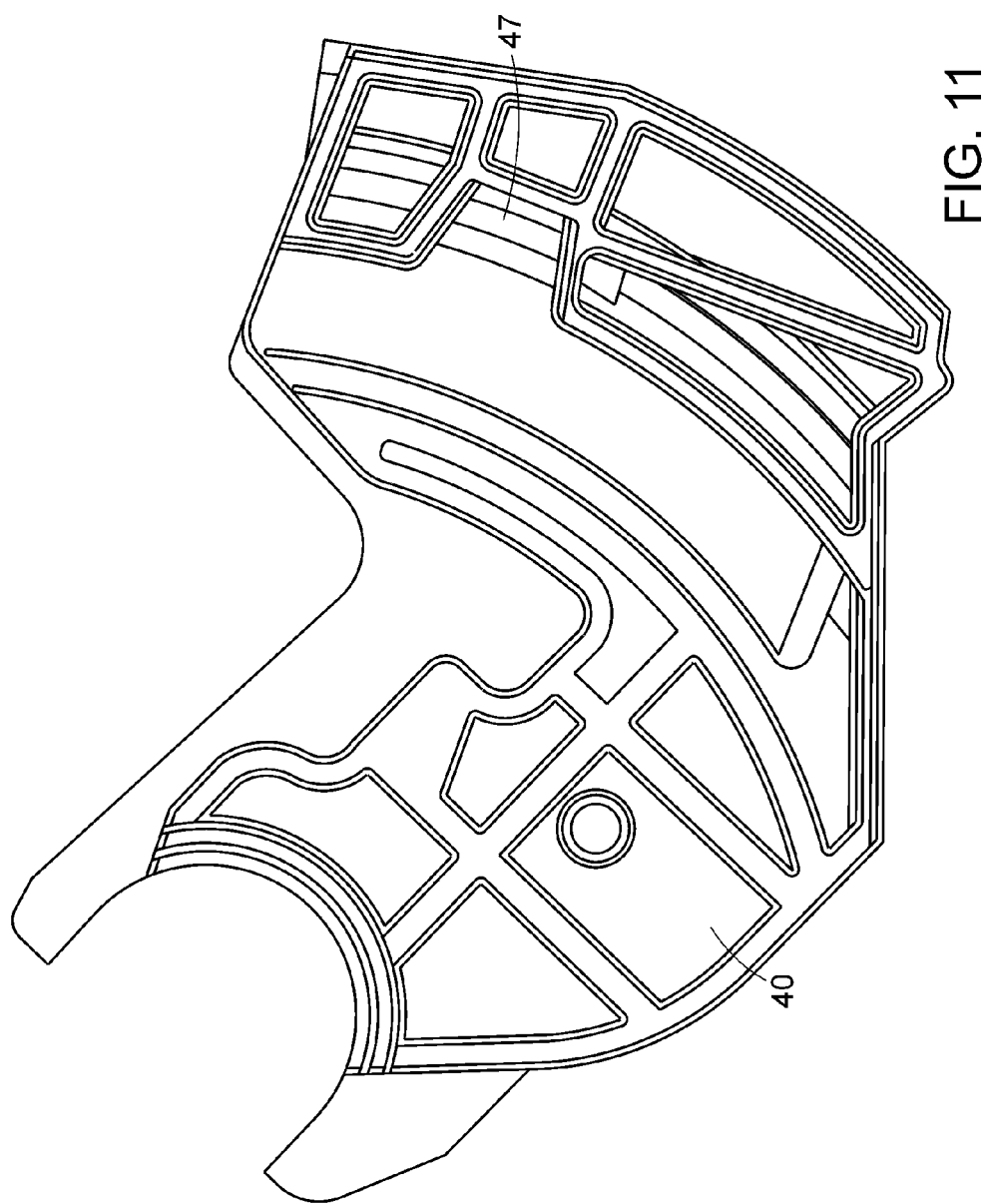
FIG. 11 is an enlarged cross-sectional left side perspective view of a detent unit of the gearshift mechanism when the gearshift lever is arranged in the neutral position.

Referring to FIGS. 9-11, once the fold actuator 22 is activated, the fold rod moves longitudinally along the detent unit 40 in the groove 47, and the lower part 26 of the fold rod engages the release branch 54, forcing the locking arm 50 to rotate and the locking branch 52 to disengage from the detent 46 in the outer portion of the detent unit 40 (see FIG. 4). The detent unit 40 is now rotationally engaged with the fold rod, and thus any attempt to rotate the gearshift lever 20 will also rotate the detent unit 40. This dependent movement between the gearshift lever 20 and the detent unit 40 results from the engagement of the fold rod with the groove 47, and the release body 35 being locked in the N or neutral position in the release hook 48. In this configuration, the gearshift lever 20 is foldable without affecting the gearshift position, since the gearshift position is only registered as the result of relative movement between the gearshift lever 20 and the detent unit 40.

According to the subject invention, the gearshift position remains in the N or neutral position throughout the entire movement of the gearshift lever 20 between the unfolded operative position and the folded non-operative position. The folded non-operative position of FIG. 10 is reached when the gearshift lever 20 has rotated to a fully forward position with respect to a longitudinal direction of the vehicle. When the gearshift lever 20 has reached this point, the locking arm 50 can rotate and engage with a portion of the detent unit 40, and thus lock the detent unit 40 and the gearshift lever 20 with a small frictional force.

Moreover, since the gearshift lever 20 can only be folded in the N or neutral position, there is no risk of folding in an intermediate position between two gear positions, or that unwanted or accidental movement of the gearshift lever 20 in its folded non-operative position will cause the vehicle to move.

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications and other references cited herein are hereby expressly incorporated herein in their entireties by reference.

What is claimed is:

1. A gearshift assembly for a motor vehicle, comprising: a housing; a detent unit having a plurality of detents corresponding to gearshift positions, the detent unit being pivotally mounted to the housing; a gearshift lever configured to rotate relative to the detent unit, the gearshift lever having an operative position and a non-operative position; a locking mechanism configured to engage the detent unit in the operative position to prevent rotation of the detent unit and select one of the gearshift positions, and disengage from the detent unit in the non-operative position; and a fold actuator operably connected to the locking mechanism for disengaging the locking mechanism from the detent unit in the non-operative position, such that the detent unit and the gearshift lever rotate relative to the housing.

2. The gearshift assembly of claim 1, wherein the detent unit is rotatably mounted relative to the housing at a first pivot point.

3. The gearshift assembly of claim 2, wherein upon disengagement of the locking mechanism from the detent unit, the gearshift lever and the detent unit dependently engage such that the gearshift lever is moved to the non-operative position.

4. The gearshift assembly of claim 2, wherein the locking mechanism includes a locking arm pivotally attached to the housing at a second pivot point.

5. The gearshift assembly of claim 4, wherein at least a portion of the locking arm engages with the detent unit in the non-operative position.

6. The gearshift assembly of claim 1, wherein the fold actuator includes a button operably connected to a fold rod that disengages the locking mechanism from the detent unit, the fold rod becoming engaged with the detent unit.

7. The gearshift assembly of claim 1, wherein the fold actuator is selectable only when the gearshift lever engages the detent unit in a specific position of the detent unit.

8. The gearshift assembly of claim 7, wherein the gearshift positions include reverse, neutral, automatic, and manual.

9. The gearshift assembly of claim 8, wherein the specific position enabling selection of the fold actuator is the neutral gearshift position.

10. The gearshift assembly of claim 1, wherein the locking mechanism includes a locking arm, the locking arm including at least a portion for engaging the detent unit in the operative position.

11. The gearshift assembly of claim 10, wherein the locking mechanism is rotatably secured to the detent unit by the locking arm in the operative position.

12. The gearshift assembly of claim 1, wherein the gearshift lever includes a release button operably connected to a rod for engaging the detent unit to select one of the gearshift positions.

13. The gearshift assembly of claim 12, wherein the release button and the rod are operably connected by a cylinder portion, the cylinder portion slidingly engaging a fold rod of the fold actuator via an aperture.

14. The gearshift assembly of claim 13, wherein at least a portion of the release button forms an interlock mechanism with at least a portion of the fold rod.

15. The gearshift assembly of claim 14, wherein the interlock mechanism prevents activation of the release button when the fold actuator is activated.

16. The gearshift assembly of claim 14, wherein the interlock mechanism prevents activation of the fold actuator when the release button is activated.

17. A method for folding a gearshift lever relative to a housing in a gearshift assembly of a motor vehicle, comprising the steps of: providing a detent unit having a plurality of detents corresponding to gearshift positions, the detent unit being pivotally mounted to the housing; providing the gearshift lever to be rotatable relative to the detent unit, the gearshift lever having an operative position and a non-operative position; engaging the detent unit with a locking mechanism in the operative position, the detent unit being prevented from rotation and the gearshift lever being rotatable to select one of the gearshift positions in the operative position; operating a fold actuator to disengage the locking mechanism from the detent unit in the non-operative position; and rotating the detent unit and the gearshift lever relative to the housing.

18. The method of claim 17, further comprising a fold rod operably connected to the fold actuator such that when the fold actuator is operated, the fold rod engages with the detent unit, and the gearshift lever is folded.

19. The method of claim 17, wherein the fold actuator is selectable only when the gearshift lever engages the detent unit in a specific position of the detent unit.

20. The method of claim 19, wherein the specific position enabling selection of the fold actuator is the neutral gearshift position.

21. The method of claim 17, wherein the locking mechanism includes a locking arm, the locking arm including at least a portion for engaging the detent unit in the operative position.

22. The method of claim 17, wherein the gearshift lever includes a release button operably connected to a rod for engaging the detent unit to select one of the gearshift positions.

23. A gearshift assembly for a motor vehicle, comprising: a housing; a detent unit having a plurality of detents corresponding to gearshift positions, the detent unit being pivotally mounted to the housing; a gearshift lever configured to rotate relative to the detent unit, the gearshift lever having an operative position and a non-operative position; a locking mechanism configured to engage the detent unit in the operative position to prevent rotation of the detent unit and select one of the gearshift positions, and disengage from the detent unit in the non-operative position; and a fold actuator operably connected to the locking mechanism for disengaging the locking mechanism from the detent unit in the non-operative position, wherein upon disengagement of the locking mechanism from the detent unit, the gearshift lever and the detent unit dependently engage such that the detent unit and the gearshift lever rotate relative to the housing.

\* \* \* \* \*